March 23, 1954 R. P. DUBUSC 2,673,137

OSCILLATION APPARATUS FOR STYLUS TYPE OSCILLOGRAPHS

Filed Dec. 14, 1950

4 Sheets-Sheet 1

INVENTOR.
Roger Pierre Dubusc
BY Kenway, Jenney, Witter and Hildreth
ATTORNEYS

March 23, 1954

R. P. DUBUSC 2,673,137

OSCILLATION APPARATUS FOR STYLUS TYPE OSCILLOGRAPHS

Filed Dec. 14, 1950

4 Sheets-Sheet 2

INVENTOR
Roger Pierre Dubusc

BY Kenway, Jenney, Witter and Hildreth

ATTORNEYS

March 23, 1954 R. P. DUBUSC 2,673,137

OSCILLATION APPARATUS FOR STYLUS TYPE OSCILLOGRAPHS

Filed Dec. 14, 1950

4 Sheets-Sheet 3

INVENTOR

Roger Pierre Dubusc

BY Kenway, Jenney, Witter and Hildreth

ATTORNEYS

March 23, 1954

R. P. DUBUSC 2,673,137

OSCILLATION APPARATUS FOR STYLUS TYPE OSCILLOGRAPHS

Filed Dec. 14, 1950

4 Sheets-Sheet 4

INVENTOR

Roger Pierre Dubosc

BY Kenway, Jenney, Witter and Hildreth,

ATTORNEYS

Patented Mar. 23, 1954

2,673,137

UNITED STATES PATENT OFFICE 2,673,137

OSCILLATION APPARATUS FOR STYLUS TYPE OSCILLOGRAPHS

Roger Pierre Dubusc, Boulogne, France, assignor to Compagnie pour la Fabrication des Compteurs et Materiel d'Usines a Gaz, Montrouge (Seine), France, a corporation of France Application December 14, 1950, Serial No. 200,706

1 Claim. (Cl. 346—111)

Figure 1:
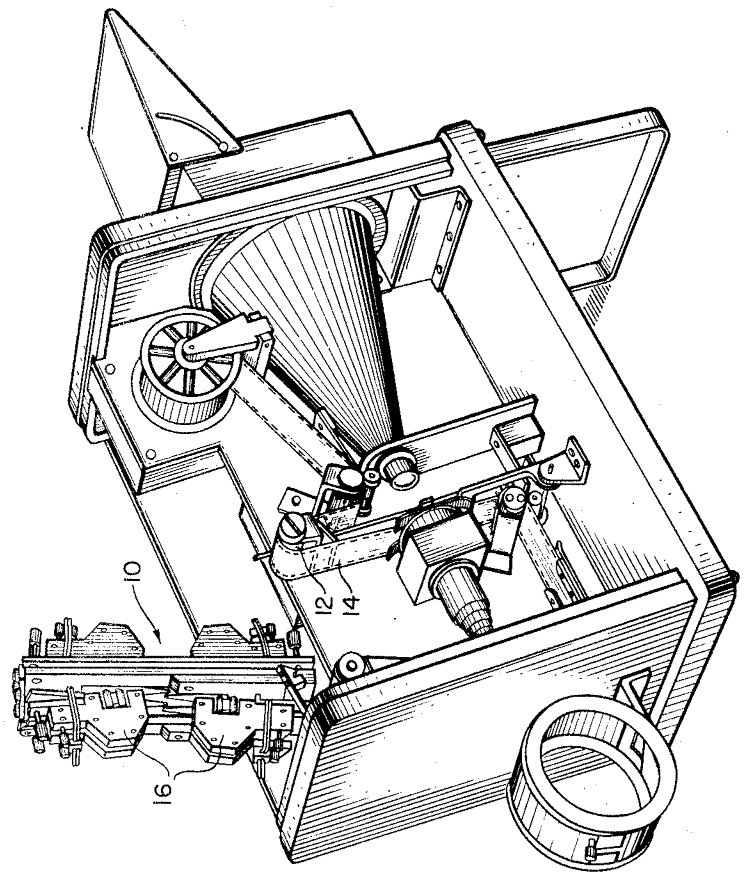

This invention relates to oscillographs and more particularly to improved oscillation apparatus for stylus type recorders.

In the analysis of transient phenomena in electrical lines, it is often desirable to compare a number of interrelated wave forms. This may be done by oscillographically recording the various waves on separate tapes, and then juxtaposing the tapes for comparison. Such a procedure, however, is inconvenient, and since there may be variations on the time axis between several recorders, accuracy is extremely difficult. Recording the various waves simultaneously on a single tape has been accomplished in the past by deflected light beams arranged to record in parallel relationship on a photo-sensitive tape. The advantage of recording the waves on a single tape is to eliminate variables on the time axis. However, the light beam apparatus has numerous drawbacks. First, it is extremely delicate requiring great expense in construction and great skill in operation; second, it requires a very wide and therefore expensive tape; and finally, the trace recorded by the light beam is crude, inaccurate, and varies in thickness and clarity as the light beam varies in speed. Stylus recorders obviate a number of these difficulties because they are more durable, less expensive, and their trace is fine and remains uniform in thickness regardless of the speed of the stylus. Hitherto, however, stylus recorders have not generally been employed in this type of transient phenomena analysis because of other drawbacks relating in part to the stylus oscillator and in part to the recording medium. This invention is directed primarily to the stylus oscillator, the recording medium being disclosed in my copending application Serial No. 200,418, entitled "Oscillographic Recording Medium," filed December 12, 1950.

The principal drawback of conventional stylus oscillators is that they render a distorted wave form at any but the very lowest frequency of oscillation. This is caused by the fact that in the usual construction there is a very low ratio of torque to mass and the inertial factor causes distortion in the wave form. Distortion is also caused by hysteresis in the conventional stylus type recorders. Other disadvantages include lack of a convenient damping mechanism, and the fact that conventional oscillators are generally too bulky to permit side-by-side arrangement for comparative recording on a narrow tape.

Therefore it is an object of my invention to provide an oscillator for a stylus tape recorder which renders a substantially true wave form image within higher frequencies than have heretofore been feasible with stylus type recorders. It is also an object of my invention to provide such an oscillator with small dimensions whereby it may be arranged side-by-side with a number of oscillators of its kind for simultaneous recordation of numerous traces on the same tape. A further object is to provide a construction which will be durable, comparatively inexpensive, and easy to operate.

In the accomplishment of these and other objects, I employ as an oscillator, an armature or, as herein referred to, a plate mounted for limited rotation about a vertical axis against the force of a spring. The plate is acted upon by a resultant magnetic couple produced by the cooperative force of a permanent magnet whose lines of force are essentially perpendicular to the plane of the plate and a plurality of electro-magnets whose lines of force are essentially parallel to the plane of the plate. With this arrangement the magnetic couple is proportional to the current in the coils of the electro-magnets, thereby permitting recordation of current or voltage oscillations in an associated electrical circuit. The actual torque applied to the plate, however, depends in part on the strength of the permanent magnet. Therefore by increasing the strength of the permanent magnet, the ratio of torque to the mass of the plate may be high without requiring high current values in the electro-magnets. This feature has the effect of minimizing inertial distortion in the recorded wave form. A further feature of this arrangement is that it permits a substantial movement of the plate, up to about 25% of the air gap, with the magnetic couple still remaining substantially proportional to the current.

It is a further feature of my invention that the movement of the oscillation plate is damped electrically by means of a shunt in parallel to the circuits of the above mentioned electro-magnets.

An additional feature of my invention relates to the shape of the oscillation plate. It is essentially parallelepiped in contour and its bases are in the form of lozenges; that is, with one long diagonal and one short diagonal. This shape is important in reducing magnetic saturation effects in the said plate.

Still another feature of my invention relates to the way in which the oscillation plate is mounted. An especially designed torsion bar is constructed to support the plate near the mean point of the forces acting upon the plate, and while permitting rotation, the torsion bar is substantially rigid against lateral bending forces.

Figure 2:
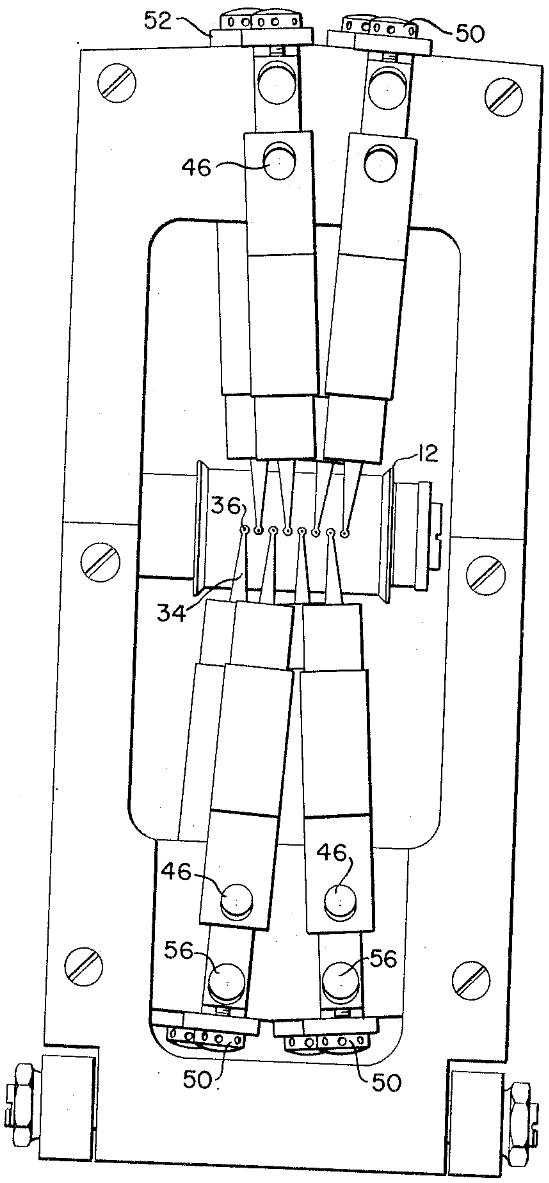
Figure 3:
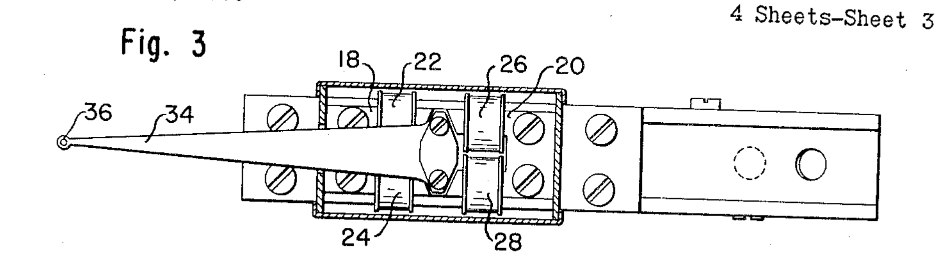
Figure 4:
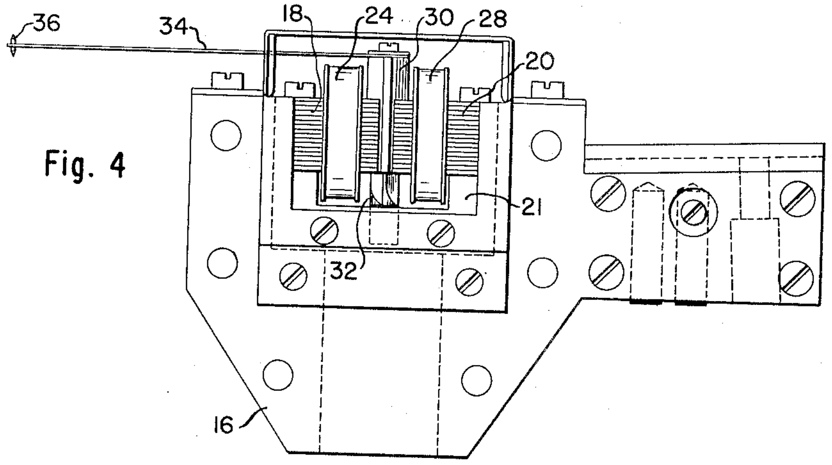
Figure 5:
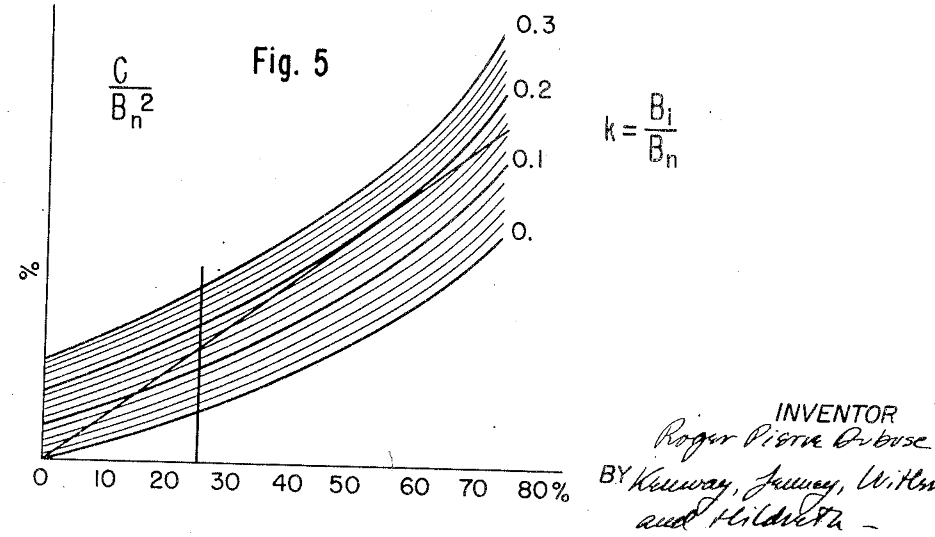
Figure 6:
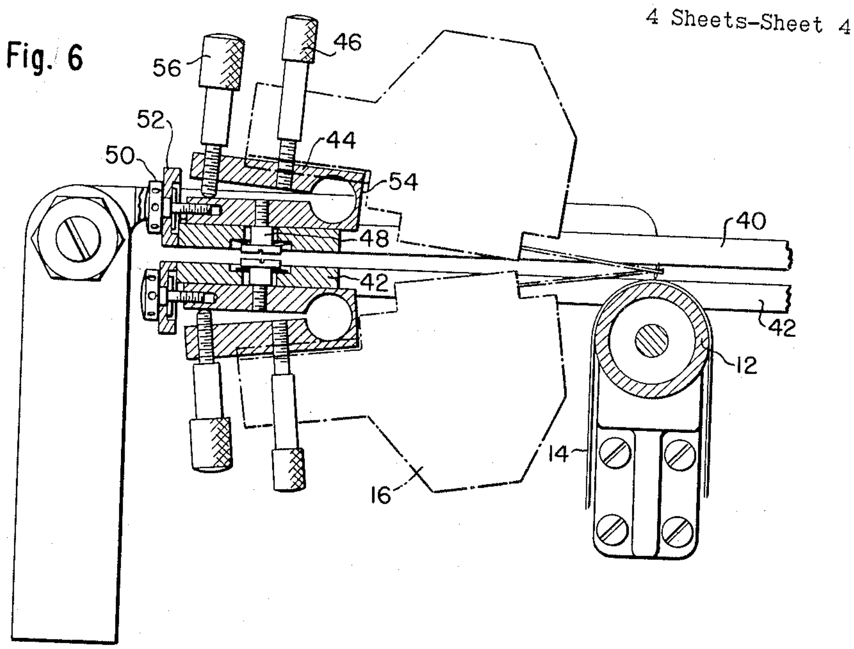
Figure 7:
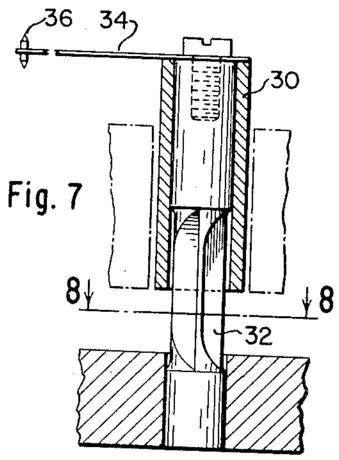
Figure 9:
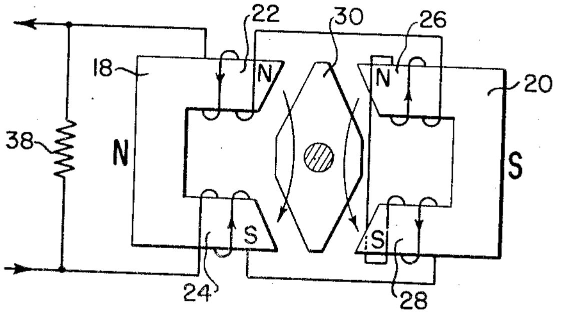
Figure 8:
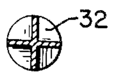

Further objects and features of my invention will best be understood and appreciated from a detailed description of a preferred embodiment thereof selected for purposes of illustration and shown in the accompanying drawings in which:

Fig. 1 is a view in perspective of the oscillograph of my invention showing eight stylus oscillators mounted on an arbor and with the arbor in an elevated position, Fig. 2 is a plan view of the arbor of Fig. 1 diagrammatically showing eight stylus oscillators mounted for side-by-side recordation of eight traces on a single tape, Fig. 3 is a plan view of one of the stylus oscillators, Fig. 4 is a view in side elevation of one of the stylus oscillators, Fig. 5 is a graph in normalized units showing the relationship of torque to displacement of the oscillator plate, Fig. 6 is a side view in cross section along the lines 3—3 of Fig. 2 showing how the stylus oscillators are mounted on the arbor, Fig. 7 is a sectional view in side elevation of the torsion bar mounting of the oscillator plate, Fig. 8 is a plan sectional view of the torsion bar, and Fig. 9 is a wiring diagram indicating the magnetic poles for a given current direction.

In the preferred embodiment of my invention herein shown, I mount upon an arbor 10 eight stylus oscillators, one of which is shown in Figs. 3 and 4. The arbor 10 is pivotally mounted on the main frame of the oscillograph and may be lowered to bring the stylus oscillators into registration with a drum 12 upon which a recording tape 14 is drawn. The feed apparatus employed herein for tape 14 is more fully described in my copending application Serial No. 144,252, filed February 15, 1950.

Referring now more specifically to the oscillator shown in Figs. 3 and 4, it includes in its general organization a permanent magnet 16, electro-magnets 18 and 20, coils 22 and 24 for electro-magnet 18, coils 26 and 28 for electro-magnet 20, an oscillation plate 30, a torsion bar 32 supporting the said plate 30, an arm 34 mounted on said plate, and a stylus 36 at the outer end of said arm 34.

The permanent magnet 16 is flat in construction and substantially U-shaped in contour. The electro-magnets 18 and 20 are mounted on a base plate 21 and are secured within the opening of the U of permanent magnet 16. The oscillation plate 30 is in the form of a vertical parallelepiped having lozenge shaped bases perpendicular to the sides. It is mounted between the electro-magnets 18 and 20 with a narrow air gap separating the said plate from the magnets. As can be more clearly seen in Figs. 7 and 8, the oscillation plate 30 is perforated centrally through its vertical axis and receives in the said perforation the upper end of the torsion bar 32 which is press-fitted therein. It will be seen that the torsion bar 32 supports the oscillation plate 30 for rotational movement about its central vertical axis, and that the lower point of contact between bar 32 and plate 30 is close to the mean point of the opposing faces of the electro-magnets 18 and 20. With particular reference to Fig. 8, it will be seen that the torsion bar 32 is substantially in the shape of a cross in cross section. This construction provides rigidity against lateral bending forces, whereas torque applied along the vertical axis receives little resistance.

The torsion bar 32 is composed of high-carbon, spring steel and provides a substantially linear resistance to torque within the limits of movement contemplated in the present equipment. The material employed in construction of the oscillation plate 30 and electro-magnets 18 and 20 may be a type of soft iron and preferably is specifically selected for properties of low hysteresis loss. It will be seen that the lozenge cross-section of the plate 30 is particularly suited to avoid magnetic flux saturation.

For an explanation of the operation of oscillation, reference may be had to the wiring diagram shown in Fig. 9. The magnetic poles of the permanent magnets 16 are indicated in Fig. 9 by "N," "S" at each side of the electro-magnets 18 and 20. The coils 22, 24, 26 and 28 of the electro-magnets are arranged in series and a shunt 38 is provided in parallel across the line. When a current is introduced into the line in the direction of the arrows shown, coils 22 and 26 induce a magnetic flux corresponding to poles as indicated by "*n*," and likewise coils 24 and 28, poles as indicated by "*s*." Thus the magnetic lines of force produced by the electro-magnets are substantially parallel to the plane of the longest diagonal of plate 30, while the lines of force of magnet 16 are substantially perpendicular thereto. Under these circumstances the magnets cooperate to induce a counter-clockwise torque on the oscillation plate 30 as shown. This may be expressed as being proportional to:

$$(B_n+B_i)^2-(B_n-B_i)^2=4B_nB_i$$

where $B_n$ represents the flux density of magnet 16 and $B_i$ represents the flux density of the electro-magnets. Furthermore, since $B_i$ is proportional to the current in coils 22, 24, 26 and 28, the couple is then proportional to the current in said coils. It will be noted however that the value of $B_n$ may be high in this arrangement and thereby permit high torques without requiring an excessive number of turns in coils 22, 24, 26 and 28.

Of course, the magnetic couple varies due to changes in the air gap, but with this arrangement the air gap may be reduced as much as 25% without substantially disturbing the linear relationship between current and magnetic couple. By way of illustration reference may be had to Fig. 5 which shows the values employed in the preferred embodiment as reduced to normalized units. The abcissa represents the percentage of air gap closed, and the ordinate represents the couple. The curves represent different values of current in the coils, these values being defined by the relationship $$K=\frac{B_i}{B_n}$$

that is between the flux density produced by the current in the electro-magnets and that of the permanent magnet. The straight line running diagonally up from the zero point on both scales represents the resisting torque of the torsion bar 32. It will be seen that the lines representing the magnetic couple intersect the line of the torsion bar torque at substantially equal spacing up to about 25% reduction in the air gap.

Under these circumstances the magnetic couple of the permanent magnet may be more than one half the resisting torque of the bar 32. Furthermore, the relationship $$K=\frac{B_i}{B_n}$$

may reach 0.15 for a deviation corresponding to full scale.

The shunt 38 provides a circuit for an electrical damping action of coils 22, 24, 26 and 28.

With reference to Fig. 2, it will be seen that eight oscillators of this type may be mounted on arbor 10, in slightly converging relationship. Under normal circumstances a convergence of a few degrees is permissible, but if the oscillators must be absolutely parallel such can be arranged by making the arbor wider and employing a wider tape. In the form shown, a conventional 35 mm. tape is employed and is therefore desirable from a cost standpoint.

The pressure of the stylus 36 upon the tape may be in the neighborhood of one gram, such being regulated by screw adjustments. With reference to Fig. 6 it will be seen that the arbor includes an upper plate 40 and a lower plate 42. The oscillators are mounted on these plates with four on plate 40 and four on plate 42, two on each end converging toward the center. Each oscillator is secured to a split spring block 44 by a machine screw 46 passing through an extended end of the oscilaltor integral with magnet 16. The spring 44 is secured to plate 40 or 42 by a machine screw 48 adapted for slight longitudinal movement. Control of the longitudinal movement of the said spring block 44 is accomplished by a screw 50 cooperating through a thrust flange 52 appropriately mounted on the end of plate 40 or 42. The screw 50 communicates with the end of spring block 44. Vertical adjustment is accomplished by a screw which is threaded through one half of the split spring block 44 and operates to open or close the said block pivoting the oscillator about a point 54 at the inner end of said spring.

From the foregoing description it will be seen that I have provided an oscillator for stylus type recorders in which the mass of the moving elements is slight and in which the torque which may be applied thereto is proportionately high. Furthermore, with this arrangement the number of turns required in the electromagnets may be proportionately low because the permanent magnet 16 may be regarded as responsible for a majority of the torque. The design of the oscillation plate 30 substantially avoids magnetic saturation distortions, and the torsion bar support for the said plate is particularly adapted for rotation in the magnetic field without bending.

Certain minor variations of the specific embodiment herein shown will be apparent to those skilled in the art and therefore it is not intended to confine the invention to the precise form shown, but rather to limit it in terms of the appended claim.

Having thus disclosed my invention and described in detail an illustrative embodiment thereof, I claim as new and desire to secure by Letters Patent:

In an oscillograph the combination with a ferro-magnetizable armature, of a stylus connected to said armature adapted for recording indicia on a recording medium, a U-shaped permanent magnet, a pair of U-shaped ferro-magnetizable cores mounted in contact with and between the legs of said permanent magnet, the legs of each said U-shaped core extending toward the legs of the other U-shaped core in opposed relation, each leg of said cores wound with a coil, and each of said coils wound in relation to the coil on an opposed leg to produce therewith opposed lines of magnetic force, said armature being mounted for pivotal motion about an axis perpendicular to the plane of said cores and centrally between the ends of the legs of said cores, said armature defining between itself and the extremities of said legs of said cores a limited air gap whereby to provide a substantially closed magnetic loop.

ROGER PIERRE DUBUSC.

References Cited in the file of this patent

UNITED STATES PATENTS

| Number | Name | Date |
|---|---|---|
| 1,439,543 | Frost | Dec. 19, 1922 |
| 1,709,571 | Harrison | Apr. 16, 1929 |
| 1,784,517 | Farrand | Dec. 9, 1930 |
| 1,837,188 | Keller | Dec. 22, 1931 |
| 2,466,469 | Nicholls | Apr. 5, 1949 |
| 2,546,284 | Weisbecker | Mar. 27, 1951 |

FOREIGN PATENTS

| Number | Country | Date |
|---|---|---|
| 123,049 | Switzerland | June 17, 1926 |
| 245,416 | Switzerland | July 16, 1947 |
| 371,330 | Great Britain | Oct. 17, 1930 |